United States Patent [19]

Bryfogle

[11] Patent Number: 5,451,134
[45] Date of Patent: Sep. 19, 1995

[54] MATERIAL HANDLING DEVICES AND CONTROLLERS

[76] Inventor: Mark D. Bryfogle, 217 N. Galveston St., Arlington, Va. 22203

[21] Appl. No.: 107,043

[22] Filed: Aug. 17, 1993

Related U.S. Application Data

[63] Continuation of Ser. No. 780,282, Oct. 22, 1991, abandoned.

[51] Int. Cl.$^6$ ............................................. B25T 17/00
[52] U.S. Cl. .................... 414/680; 74/490.05; 74/490.08; 248/163.1; 248/653; 901/28; 414/589
[58] Field of Search ............... 414/589, 590, 680, 917, 414/5, 7; 901/22, 23, 27, 28, 29; 248/184, 183, 653, 654, 163.1; 74/479 BJ, 479 BW, 479 PF, 490.05, 490.06, 490.08; 324/207.18

[56] References Cited

U.S. PATENT DOCUMENTS

| | | | |
|---|---|---|---|
| 2,944,331 | 7/1960 | Munn et al. | 248/676 |
| 3,087,630 | 4/1963 | Karnow et al. | 74/471 |
| 3,215,391 | 11/1965 | Storm | 248/184 |
| 3,229,941 | 1/1966 | Suliteanu et al. | 248/163.1 |
| 3,288,421 | 11/1966 | Peterson | 108/4 |
| 3,577,659 | 5/1971 | Kail | 248/163.1 X |
| 3,952,979 | 4/1976 | Hansen | 248/163.1 |
| 4,216,467 | 8/1980 | Colston | 74/471 |
| 4,565,487 | 1/1986 | Kroczynski | |
| 4,641,123 | 2/1987 | Whitehead | 74/471 |
| 4,651,589 | 3/1987 | Lambert | 901/22 X |
| 4,655,675 | 4/1987 | Yasuoka | 414/917 X |
| 4,684,314 | 8/1987 | Luth | 414/590 X |
| 4,819,496 | 4/1989 | Shelef | 74/471 |
| 4,844,685 | 7/1989 | Sagaser | 414/699 X |
| 4,962,448 | 10/1990 | DeMaio et al. | 338/128 X |
| 4,976,582 | 12/1990 | Clauel | 901/28 X |
| 5,028,180 | 7/1991 | Sheldon et al. | 248/654 X |
| 5,052,736 | 10/1991 | Loncaric et al. | 901/39 X |
| 5,053,687 | 10/1991 | Merlet | 901/28 X |
| 5,072,361 | 12/1991 | Davis et al. | 414/5 X |
| 5,083,892 | 1/1992 | Oswald et al. | 414/589 X |
| 5,114,300 | 5/1992 | Shahinpoor et al. | 248/654 |
| 5,129,279 | 7/1992 | Rennex | 414/735 X |
| 5,180,979 | 1/1993 | Frazzini | 324/207.18 |

FOREIGN PATENT DOCUMENTS

| | | | |
|---|---|---|---|
| 2083795 | 3/1982 | United Kingdom | 414/729 |
| 2185593 | 7/1987 | United Kingdom | 414/4 |
| 529072 | 12/1976 | U.S.S.R. | 414/5 |
| 558788 | 7/1977 | U.S.S.R. | 414/729 |
| 1049244 | 10/1983 | U.S.S.R. | 414/590 |
| 1222538 | 4/1986 | U.S.S.R. | 901/27 |
| 1558666 | 4/1990 | U.S.S.R. | 414/680 |
| 1563978 | 5/1990 | U.S.S.R. | 414/680 |

OTHER PUBLICATIONS

Fichter, E. F., "A Stewart Platform-Based Manipulator: General Theory and Practical Construction", International Journal of Robotics Research, vol. 5, No. 2, Summer 1986, pp. 157, 158, 170, 174–176, 180, 182.

*Primary Examiner*—Donald W. Underwood
*Attorney, Agent, or Firm*—Richard C. Litman

[57] ABSTRACT

A powered material handling apparatus or lift provides for the movement and positioning of large, heavy and/or bulky objects using six degrees of freedom of motion. The lift may be used for the handling of virtually any such materials, but is especially suited for the handling of such objects as jet aircraft engines and aircraft external stores. The lift may be remotely operated by a hand controller which is mechanically arranged in the same manner as that of the lift, through a power supply and servo device. Feedback may be provided to the hand controller by the power supply and servo device, thus enabling the operator of the control to sense the forces occurring at the lift as it is actuated. Additionally, provision is made for the recording of a history of the forces, torques and linear actuation of the struts of the apparatus in the event of some subsequent question regarding a particular operation. Further improvements in such devices include various methods of attachment of the lifting struts to the platforms of the lifting apparatus, as well as several methods of strut actuation and sensing of the linear position of the struts.

3 Claims, 5 Drawing Sheets

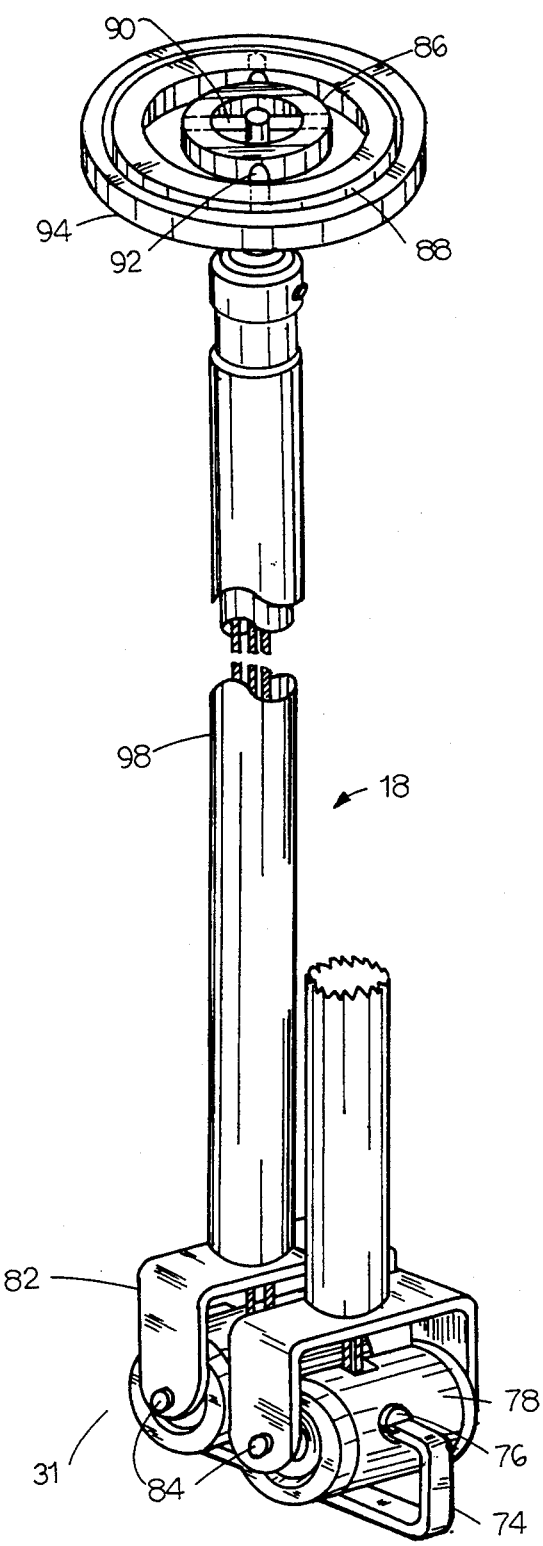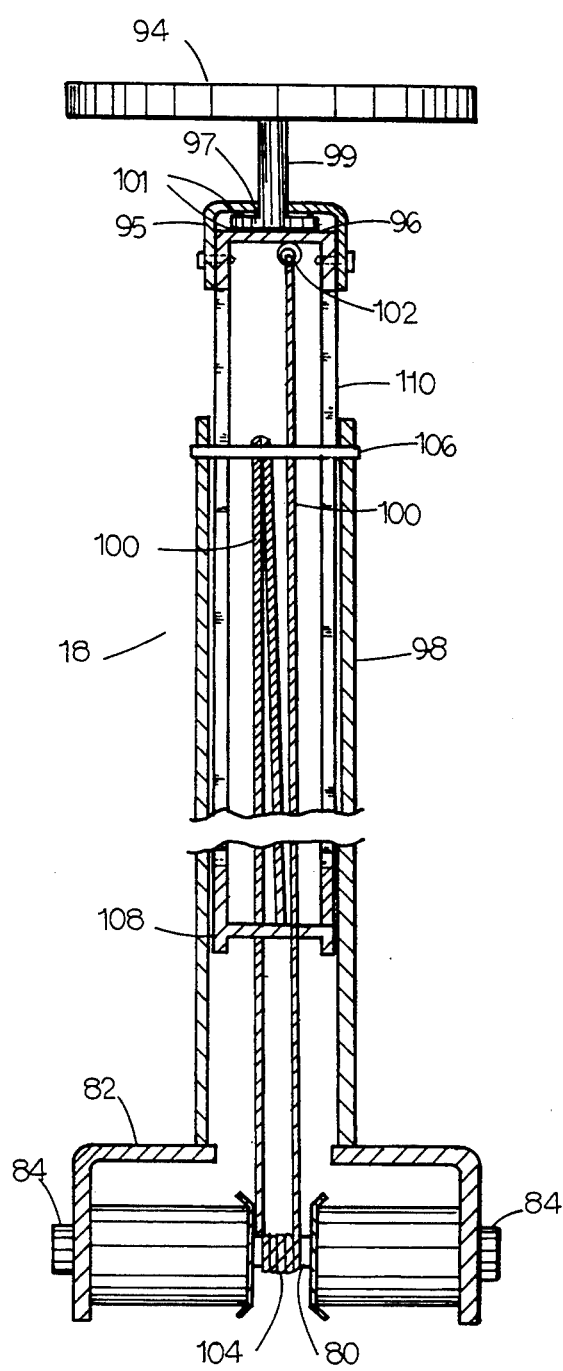

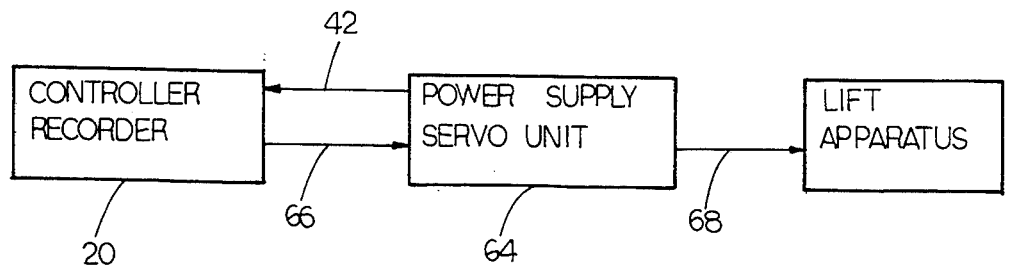
FIG. 6
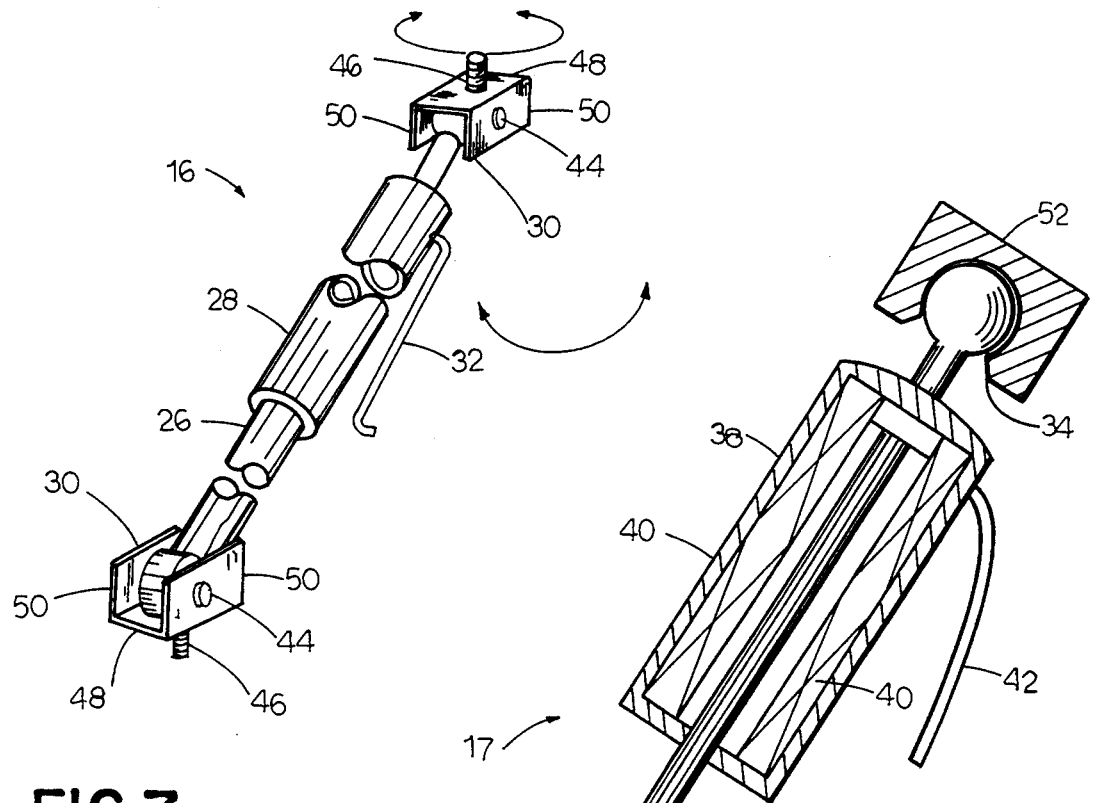
FIG. 7
FIG. 8

MATERIAL HANDLING DEVICES AND CONTROLLERS

CROSS-REFERENCE TO RELATED APPLICATION

This application is a continuation of application Ser. No. 07/780,282; filed Oct. 22, 1991, now abandoned.

FIELD OF THE INVENTION

This invention relates generally to automated devices which provide a plurality of degrees of motion, such as articulated lifting devices and the like, and more specifically to improvements in the structures and controlling systems for such devices.

BACKGROUND OF THE INVENTION

Various devices have been developed for the lifting or other movement of relatively large and/or bulky articles. A particular area of need for such devices is in the field of aviation, where such devices are generally used for loading ordnance and external stores on military aircraft, and for the installation and removal of engines from various civil and military aircraft.

Most such devices are essentially lifting platforms, and as such any motion in the horizontal plane must be provided by moving the vehicle upon which the lifting platform or device is installed. Even in those lifting devices which also provide for motion in the horizontal plane, such horizontal motion is generally provided along only a single axis. No such devices are known which provide for motion in any direction in the horizontal plane as well as along the vertical axis, and further provide angular or rotational motion as well, in the manner of the present invention.

It will be appreciated that such a device would result in a considerable savings of labor, as well as increasing safety to a great degree. Aircraft engines particularly have a variety of mounting points which must be precisely aligned with the cooperating points in the aircraft, and the inaccurate placement of the engine in the lifting device may result in a great deal of difficulty in the installation of the engine in the aircraft if that engine is supported by a lifting device which does not provide for motion in all of the generally accepted six degrees of motion. Indeed, a tragic accident occurred in 1979 due to the inadequacies of engine lifting devices, when a jet engine physically separated from the remainder of an air carrier aircraft on takeoff from Chicago's O'Hare Airport. The cause was determined to be a damaged mount on the engine due to a fork lift being used to support and transport the engine for installation on the aircraft. While procedures were in place to prevent such damage, the devices used with those procedures were, and still are, cumbersome, difficult, and time consuming to use.

The need arises for improvements in lifting and/or motion translation devices which improvements will provide for linear and angular motion along and about all three axes, thus providing six degrees of motion. An important feature of such a device is to provide for the recording of the forces and torques involved in operation over a period of time, in order to show evidence of the operating procedures used in a given operation should a question arise subsequently. The improvements must further provide for easy operation by a single person using a simple controlling device, which device should provide positive pressure feedback to the operator in order for the operator to more accurately sense the forces and torques involved.

DESCRIPTION OF THE RELATED ART

J. A. Munn et al. U.S. Pat. No. 2,944,331 discloses an engine installation frame for use with larger jet aircraft engines. The device fails to meet many of the above needs, as it provides for only manual adjustment in only a single plane. If alignment is off along another axis, the entire frame (which does not provide for any horizontal motion) or aircraft must be moved for realignment.

P. Karnow et al. U.S. Pat. No. 3,087,630 discloses an automated omnidirectional manipulating device for use in military aircraft ordnance handling. The device provides an extended arm capable of providing motion along and about various axes, but operates in a completely different manner than that used by the present invention. Moreover, the control means is located immediately adjacent the ordnance and no means is provided for alternative control locations.

E. R. Peterson U.S. Pat. No. 3,288,421 discloses a movable and rotatable platform which is supported by a series of six linearly adjustable struts. This device is generally known as a "Stewart Platform," after a developer of the general concept. While the present invention is generally based upon this concept, several improvements are disclosed which extend beyond the original basic device. Further, no remote control or feedback means is provided in the above patent.

S. Hansen U.S. Pat. No. 3,952,979 discloses a vibration isolator which is based upon the geometric principles involved in the Stewart Platform. While the six struts between the upper and lower plates are adjustable in length, it is not clear how the device is operable as no means is provided for angular displacement of each of the struts as its length is varied. Thus, the device provides only extremely limited displacement between the two plates.

J. R. Colston U.S. Pat. No. 4,216,467 and J. M. M. Whitehead each disclose hand controller units which are generally based upon the Stewart Platform principle of operation. These two devices do not provide for any feedback pressure from the apparatus being controlled, but rather provide transducer devices within each interconnecting strut which transmit electrical signals dependent upon either the force (Colston) or the displacement (Whitehead) applied to the struts.

Finally, G. Shelef U.S. Pat. No. 4,819,496 discloses a manipulator device for robotic use. The geometric arrangement of the actuator struts is not similar to the present invention, and other differences are noted.

None of the above noted patents, either singly or in combination, are seen to disclose the specific arrangement of concepts disclosed by the present invention.

SUMMARY OF THE INVENTION

By the present invention, an improved apparatus capable of providing general linear and general angular motion is disclosed.

Accordingly, one of the objects of the present invention is to provide such an improved apparatus which is capable of handling relatively heavy materials and objects, such as military aircraft external stores and large turbine engines, with adequate safety and accuracy.

Another of the objects of the present invention is to provide such an apparatus which may be remotely controlled and operated.

Yet another of the objects of the present invention is to provide a controller for such an apparatus which operates using the same geometric arrangement as that of the material handling apparatus itself.

Still another of the objects of the present invention is to provide feedback means to the apparatus controller and record a time history of that feedback.

A further object of the present invention is to provide a plurality of means for the attachment of the struts to the opposing plates of both the apparatus and the controller.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a fragmented perspective view of a strut assembly of the present invention, showing an upper and lower end bearing arrangement.

FIG. 1A is a side view in section of the strut assembly of FIG. 1, showing the internal arrangement.

FIG. 6 is a block diagram of the system.

FIG. 7 is a partially broken perspective view of an alternative strut showing the general arrangement and attachment means.

FIG. 8 is a side view in section of another alternative strut actuation and attachment means.

Similar reference characters designate corresponding parts throughout the several figures of the drawings.

DESCRIPTION OF THE PREFERRED EMBODIMENT

Figure 9A:
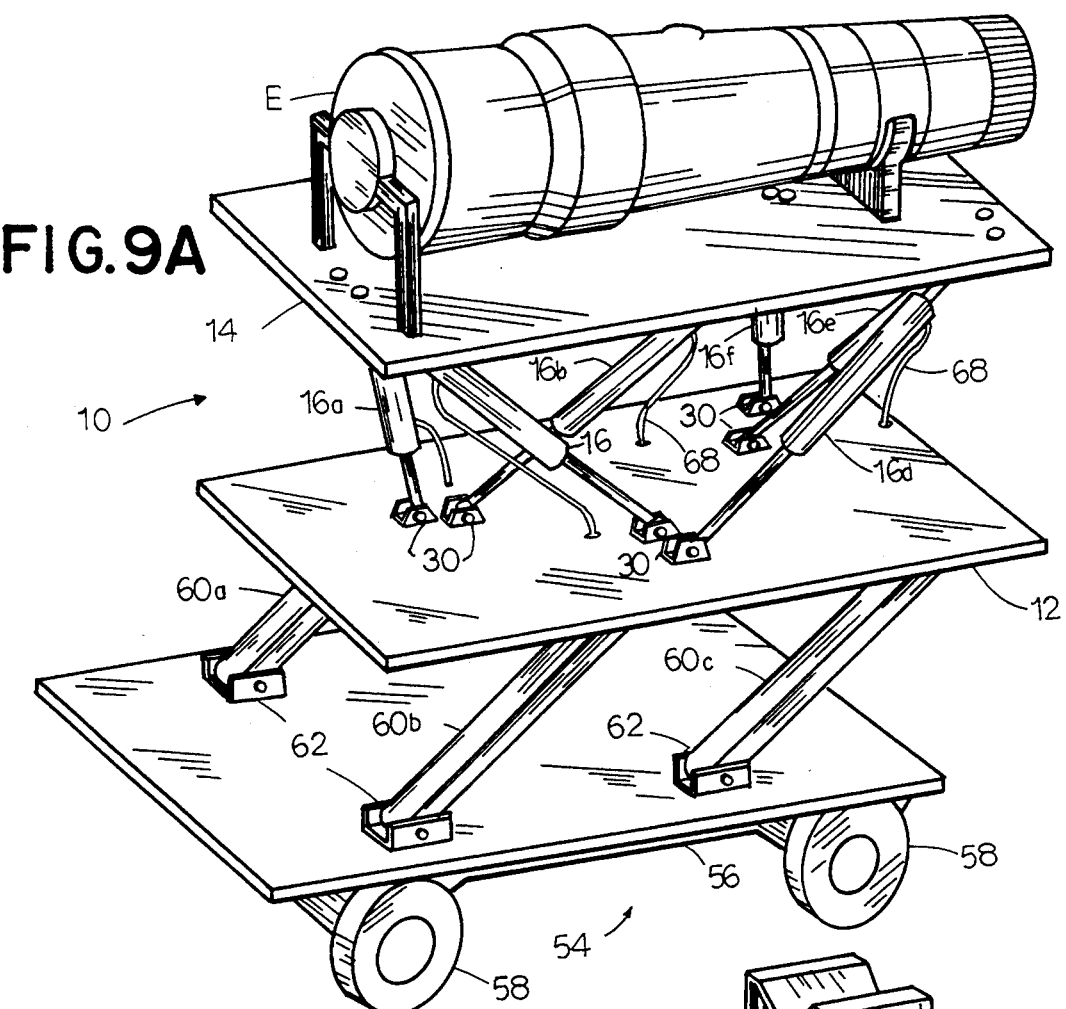
FIG. 9A is a perspective view of the omnidirectional lifting apparatus in use, shown in combination with an additional lifting apparatus.
Figure 9B:
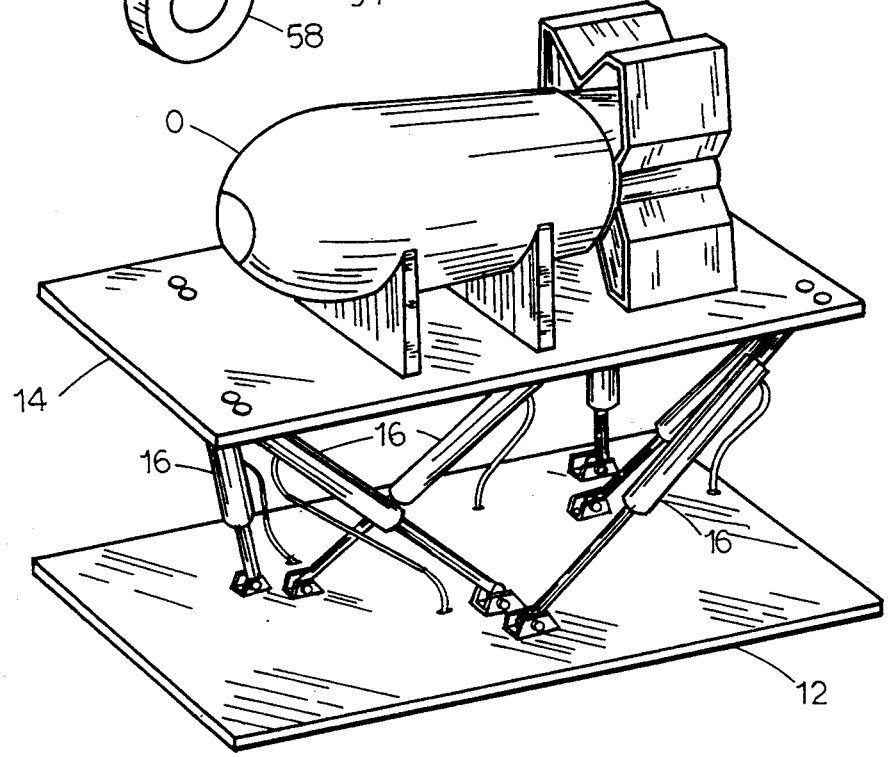
FIG. 9B is a perspective view of the basic apparatus of FIG. 9A being used as an ordnance or external stores lift.

Referring now to the drawings, particularly FIGS. 9A and 9B of the drawings, the present invention will be seen to relate to an omnidirectional material handling or lifting device, generally noted as 10, and various improvements in the operation and structure of such a lift 10 as shown further in the various remaining drawings. Lift 10 will be seen to comprise a lower platform 12 and an upper platform 14, which platforms 12 and 14 are separated by a geodetic array of six struts 16a through 16f. It should be noted that while additional struts 16 may be used, that the arrangement of six struts shown constitutes the minimum number required in order to provide the six degrees of freedom of movement required for such a lifting device 10.

Figure 4:
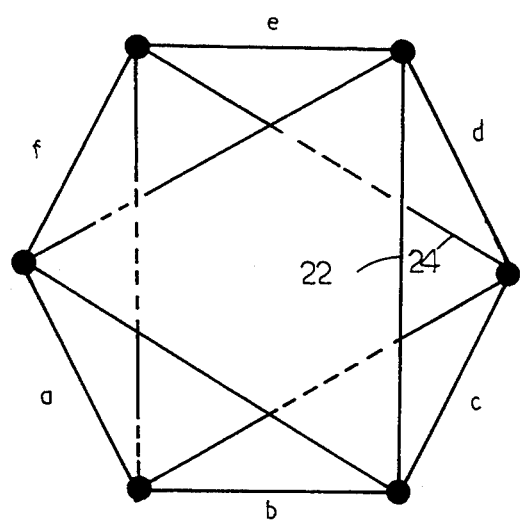
FIG. 4 is a schematic diagram of the arrangement of the struts of the lifting apparatus and of the controller.

Struts 16a through 16f may be considered to be arranged in a hexagonal pattern when viewed from either directly above or below, as shown in the schematic of FIG. 4. The letters a through f of FIG. 4 denote the corresponding positions of lift struts 16a through 16f shown in FIG. 9A. The arrangement of the attach points for struts 16a through 16f shown in FIG. 4 results in a triangulated configuration for the upper ends and the lower ends of struts 16a through 16f. However, it will be recognized that of course the upper and lower surfaces of any such device may take on any desired shape, so long as the attach points for struts a through f form the general arrangement shown in FIG. 4.

Figure 5:
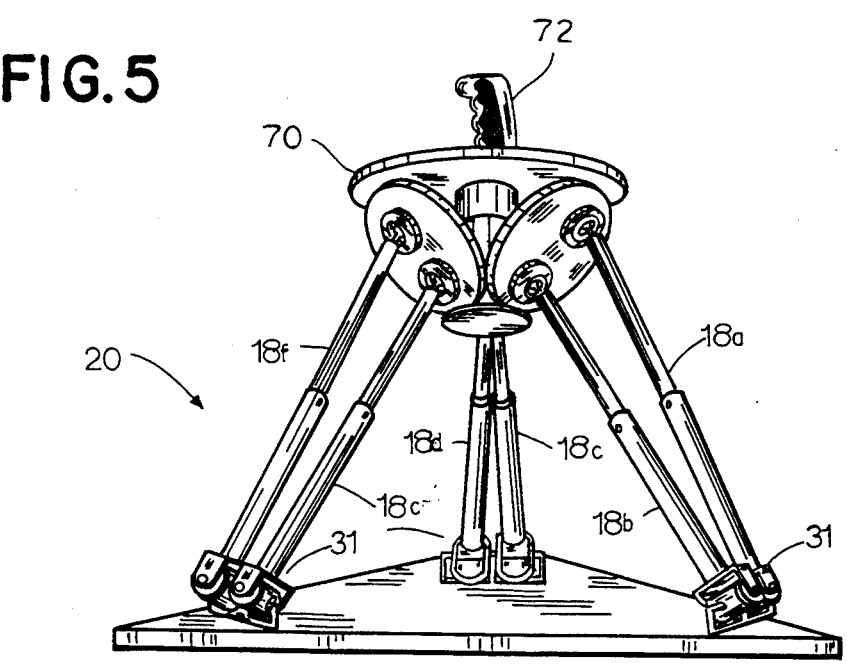
FIG. 5 is a perspective view of the controller.

This same general arrangement may also be applied to the configuration of struts 18a through 18f in controller apparatus 20 of FIG. 5, which will be discussed in detail further below, or in combination with other types of strut mechanisms such as the electrically actuated strut 17 of FIG. 8. It will also be seen that struts 16a through 16f alternately extend between lower platform 12 and upper platform 14 of lift 10, and further take on the same general arrangement in any such similar device as shown in the schematic of FIG. 4 or as in the arrangement of controller 20 of FIG. 5. While the schematic view of FIG. 4 shows a common series of attach points for each pair of strut ends in order to provide a simplified figure, it will be understood that separate attach points are necessary for each end of each strut as shown in FIGS. 9A, 9B and 5.

A single strut 16 of the type shown in FIG. 9A is disclosed in FIG. 7. Strut 16 will be seen to be telescopically extendible by means of inner rod end 26 which is concentric with and passes into outer end 28. Strut 16 may be hydraulically or pneumatically actuated by means of line 32, or other alternative means such as electromagnetic actuation may be used as in the case of strut 17 of FIG. 8.

FIG. 8 discloses one possible type of electromagnetically actuated strut 17. Strut 17 basically comprises an inner central rod 36 and an outer concentric tube 38, in a manner similar to other known telescoping struts. Tube 38 contains electromagnetic coils 40 which form a solenoid, which is powered by cable 42. Power may be applied to coils 40 by means of cable 42 in order to attract or repel central rod 36, in order to actuate strut 17. The direction of current flow through coils 40 will determine attraction or repulsion of rod 36, and the amount of current flow will determine the force applied.

It will be seen that as any one or more struts 16a through 16f, 17a through 17f, or 18a through 18f are extended or contracted, provision must be made for both horizontal and vertical angular changes in their positions. Various alternative attachment means may be used to provide for such angular changes, such as the trunnion attachment points 30 shown in FIGS. 9A and 9B or 31 as shown in FIGS. 1 and 5, spherical joints 34 shown in FIG. 8, or the coplanar joint shown in FIG. 2. In any case, each end of each strut 16, 17 or 18 must be provided with an attachment point to the appropriate surface, which attachment point must allow at least a reasonable degree of horizontal and vertical angular movement (two degrees of freedom) for the captured end of any strut 16, 17 or 18. It is also critical that any attachment system for these struts provide for any forces on the strut to be in a purely axial direction, and that all torsional forces to the struts themselves be eliminated. The various attachment methods disclosed herein provide for such purely axial force.

An example of a trunnion 30 may be seen more clearly in FIG. 7. In order to provide for both horizontal and vertical angular motion, trunnion 30 provides for both a horizontal axis 44 and a vertical axis 46 providing for angular motion of strut 16. Trunnion 30 will be seen to comprise a base plate 48 and two parallel upwardly extending side plates 50. Side plates 50 provide for placement of horizontal axis 44, while base plate 48 provides for placement of vertical axis 46. Vertical axis 46 may also provide for the securing of trunnion 30 to upper or lower platform 12 or 14 by means of vertical axis 46.

Spherical joints 34 may also be used as an alternative means of attachment of struts 16 or 18 to upper and lower platforms 12 and 14. Spherical joints 34 may be contained within sockets 52, which sockets 52 may in turn be attached to upper and lower platforms 12 and 14 to serve in place of trunnions 30. Preferably, such spherical joints 34 would be used for applications in which the bearing loads would be lower, such as in controller 20, while trunnions 30 would be used for attach points for struts 16 in larger scale and heavier duty devices, such as lift 10. However, it is understood that either method may be used to provide attach points for the struts 16 or 18 for either controller 20 or lift 10, and further that either type of strut 16 or 18 may be used in either controller 20 or lift 18.

Figure 2:
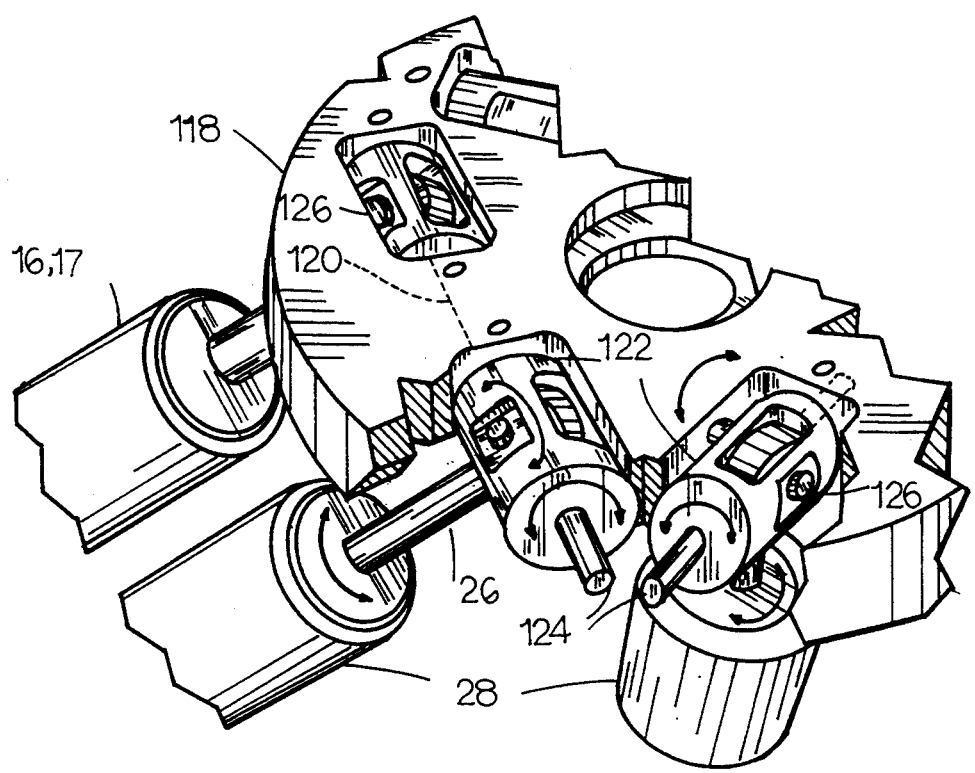
FIG. 2 is a side view in section of an alternative strut end or bearing arrangement.

A further strut attachment means is disclosed in FIG. 2. The various other attachment means each require the various attachment axes to be located outside of the planes of the upper or lower platforms. This requirement is obviated by the coplanar attachment means shown in FIG. 2. In this figure, a plate 118 which may comprise either an upper or lower surface for the attachment of struts 16, is line bored in the planar axis in three places, as at bore 120. These three bores 120 each serve as a first pivotal axis for two struts 16 or 17. Closed yokes 122 are mounted to provide a second pivotal axis 126 for each strut end, which axis 126 is 90 degrees to the first pivotal axis 124 defined by bores 120. A third degree of freedom is provided in this arrangement by the capability of the upper end 26 of a strut 16 or 17 to rotate within the outer end 28 of the strut 16 or 17.

It will be seen that the above attachment structure provides advantages in the compact attachment for such struts 16 and 17, by means of the two intersecting revolute areas provided by first and second pivotal axes 124 and 126. However, no means is provided by those two intersecting revolute areas for rotational movement along the axis defined by the strut 16 or 17 centerline. However, the inherent capability of such struts to allow rotation of the rod end 26 within the remaining strut body 28 will provide the required third rotational axis and necessary degrees of freedom for the proper operation of such a mechanism.

FIGS. 1 and 1A disclose additional devices providing for the necessary degrees of freedom, as well as providing for the extendible operation of such struts. Struts 18 of FIGS. 1 and 1A are actuated by means of an internal cable system, and may be used in combination with a controller apparatus 20 as shown in FIG. 5, or alternatively may be used to operate other lifting devices such as platform 10 shown in FIG. 9A. In fact, such a cable actuated system may prove to be desirable in areas where the possibility of hydraulic fluid leakage could cause unacceptable contamination, or for other reasons.

The trunnions 31 which provide for two degrees of freedom of motion, also provide signal output means for the relative extension of struts 18. Trunnion 31 comprises a fixed base 74, which base 74 provides for a pivotal attachment 76 to a housing 78. Housing 78 contains a potentiometer or other device (not shown) capable of measuring the rotation of a shaft 80, which shaft 80 passes through housing 78 at a 90 degree angle to the axis of pivotal attachment 76 in order to provide the required two degrees of freedom of movement. A strut attachment fitting 82 secures the lower end of strut 18 to housing 78 by means of pivots 84.

The opposite end of strut 18 is equipped with a gimbaled fitting comprising an inner ring 86 and an outer ring 88 which are pivotally joined by inner and outer axes 90 and 92, which axes 90 and 92 are at right angles to one another. This gimbal assembly 86 through 92 is in turn supported in an outer bearing ring 94, which ring 94 allows the axial rotation of the outer gimbal ring 88 therewithin.

Further rotational freedom is provided for gimbal assembly 86 through 92 by means of cap 95 which is secured to the upper end 96 of strut 18. Cap 95 serves to capture a flange 97 at the base of gimbal rod 99, which flange 97 is supported by bearings 101 between the inner portion of cap 95 and the upper end 96 of strut 18. The two rotational degrees of freedom serve to permit the two axes 90 and 92 of gimbal assembly to rotate as necessary about the longitudinal axis of strut 18, insuring that the two axes 90 and 92 providing for angular displacement of the upper end 96 of strut 18 are free to rotate relative to strut 18 and the attachment (not shown) for outer ring 94. Thus, the inherent limitations of such gimbal assemblies which comprise two perpendicular axes allowing angular displacement, are avoided by the four degrees of freedom provided. These four degrees of freedom, in combination with the two provided by trunnion 31, provide the required freedom for any upper and lower platforms attached to the gimbal assembly and trunnion and the strut secured therebetween.

Strut 18 provides positional information by means of a cable mechanism enclosed therein. FIG. 1A discloses the interior of strut 18: housing 78 and strut base 74 have been deleted from FIG. 1A for greater clarity. Strut 18 contains a cable 100 which is secured within the interior of the upper end of upper strut portion 96 at a point 102 on or very near the axial centerline of strut 18. Cable 100 extends downward from attach point 102 to shaft 80, and is wrapped with a plurality of turns 104 about shaft 80. Cable 100 then extends upward to pass around lower strut portion crossmember 106, and thence downward to finally attach to upper strut crossmember 108. Opposing slots 110 are provided in the sides of upper strut portion 96 in order to clear lower strut crossmember 106.

It will be seen that this arrangement will result in cable 100 causing shaft 80 to rotate as the upper and lower ends 96 and 98 of strut 18 are extended or retracted, as in the case of the operation of a controller 20 using struts 18. Thus, the position indicating means within housing 78 will be actuated, thereby providing positional information relating to the extension of strut 18. The resulting signal may be used to actuate a lifting device such as lift 10, or alternatively strut 18 may be used as an actuating strut rather than a controlling strut by means of electrical, hydraulic or other motors housed within housing 78 to drive shaft 80 in order to actuate strut 18.

The above mechanism has one limitation in that it does not permit the upper portion 96 and lower portion 98 of strut 18 to rotate axially relative to one another. It will be further evident from the description of trunnion 31 that no axial rotary motion is permitted in strut 18 relative to trunnion 31. Hence, the provision for axial rotation by outer bearing ring 94 surrounding the remaining gimbal assembly 86 through 92, as well as the apparatus permitting axial rotation by means of components 95, 97, 99, and 101, is needed for such a strut 18. It will be seen that the four degrees of freedom provided by the apparatus at the upper end 96 of strut 18, in combination with the two degrees of freedom provided by the trunnion apparatus at the lower end 98 of strut 18, serve to provide the required minimum of six degrees of freedom allowing for complete axial and rotational movement of such a strut 18 relative to the upper and lower attach points, as noted above. Other strut assemblies, such as the hydraulic or pneumatic strut 16 shown in FIG. 7 and the electrically actuated strut 17 shown in FIG. 8, provide for the axial rotation of one strut end relative to the other; therefore no additional provision is needed for axial rotation at one strut end attach point.

Figure 3:
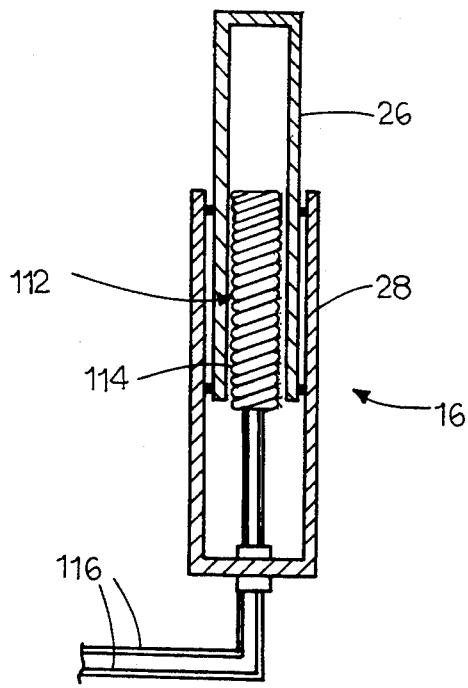
FIG. 3 is a side view in section of an internal strut position sensing device.

However, the struts 16 and 17 also possess the limitation that they do not inherently provide positional information as to the extension of the two strut ends relative to one another, as does strut 18 described above. Due to this limitation, it is necessary to provide additional means to determine the extension of the ends of struts 16 and 17 relative to one another. Preferably, such positional sensing means should be internally contained within the struts, in order to preclude the fouling of any external components or linkages or backlash or play in any external linkage which may be required. The internal transducer 112 shown in FIG. 3 of the drawings provides for this. Transducer 112 includes a coil 114 which is connected to an electrical power supply by lines 116. Transducer 112 is inserted within a strut such as a hydraulic strut 16, having inner and outer cylindrical components 26 and 28 as shown in FIG. 7. Transducer 112 operates as the inductance in coil 114 changes, due to the changing proximity of the walls of strut component 26 as strut 16 is extended or retracted. The changes in the inductance of coil 114 are transmitted by means of lines 116 to controller and recorder 20 for processing. It will be apparent that such an internal transducer 112 may also be installed within other types of struts 17 or 18, particularly in such a strut as 17 shown in FIG. 8, in order to determine the extension of such a strut.

Lift 10 is shown in combination with an additional parallel arm lifting device 54 in FIG. 9. Such a device 54 may be used to carry lift 10 and further to serve as a mounting bed for lower platform 12 of lift 10, rather than mounting a wheel and axle assembly directly to lower platform 12 of lift 10. Parallel arm lift 54 comprises a lower platform 56, which is in turn supported by a plurality of wheels 58 in order to provide mobility. Parallel arms 60a through 60d (60d is not visible due to the perspective of the drawing) are secured to parallel arm lift platform 56, and may be actuated by hydraulic or other means known in the art. Lift arm trunnions 62 or other suitable means may be used to secure the bases of parallel arms 60a through 60d to parallel arm lift platform 56, and it will be appreciated that a similar means may be used to secure the upper ends of arms 60a through 60d to the lower surface of lower platform 12 of lift 10.

It will be appreciated that the forces involved in the operation of lift 10 may possibly be on the order of several thousand pounds. Thus, some form of power supply and servo unit 64 will be necessary. Power supply/servo 64 may comprise a prime mover such as a gasoline or diesel engine and a hydraulic pump and/or electrical generator. Such power supplies are known in use with other electrically or hydraulically powered devices and the exact construction of power supply/servo 64 is not claimed as a novel feature of the present invention, but only as a power source for that invention. Power supply/servo 64 may be installed with lift 10, parallel arm platform 54, or remotely, and provide power to operate lift 10 and/or parallel arm platform 54 by means of hydraulic or other power lines 66.

Controller 20 is used to provide precise input to power supply/servo 64 by means of transmission cables 66. Transmission cables 66 provide an input signal or signals to power supply/servo 64, which signal is processed by power supply/servo 64 to provide output power to lift 10 by means of power cable 68. As the force output (either hydraulic or pneumatic pressure or electrical current) by power supply/servo 64 is directly related to the load to be maneuvered, thus greater loads will require greater force, no return signal of the force received by lift 10 is required. However, an indication of the force required as well as positional information for each strut must be provided to controller 20, in order for an operator to be able to sense the required forces. This may be accomplished by means of a proportional regulator which transmits some small fraction of the forces developed by power supply/servo 64 back to controller 20 by means of cable 42, in order to provide feedback for the operator of controller 20. Again, the forces transmitted via the various cables or lines 42. 66 and 68 may be by means of either electrical or hydraulic power or possibly by some other means not discussed. It is also desirable to record a history of the forces and positions involved in the operation of the struts and apparatus in order to provide a record of the operation in the event of a mishap or some later question involving the particular operation. This may also be easily accomplished by means of the input and output signals to controller/recorder 20.

It will be seen that the operation of lift 10 with controller 20 is a relatively simple procedure for the operator, due to the essentially smaller scale nature of the mechanism of controller 20 in comparison to lift 10. As controller 20 is essentially a reduced scale duplication of lift 10, it follows that any movement of the upper platform 70 of controller 20 by control stick 72 will result in a proportional movement of lift 10. As both lift 10 and controller 20 are capable of six degrees of freedom of motion (longitudinal, lateral and vertical displacement and angular motion about each of those axes), an operator of controller 20 may readily relate to whatever motions are required in order to maneuver a load, such as an engine E as shown in FIG. 9A or ordnance O as shown in FIG. 9B. Moreover, as a lift is begun and the forces required are increased, the forces supplied by power supply/servo unit 64 may be detected by a proportional regulator and transmitted back to controller 20 by means of cable 42 in order for the operator to develop a feel for the amount of force or torque required for a given operation. Such a system is inherently useful in the precise positioning of large, bulky and heavy objects, such as aircraft engines and ordnance.

It is to be understood that the present invention is not limited to the sole embodiment described above, but encompasses any and all embodiments within the scope of the following claims.

I claim:

1. A powered material handling apparatus providing linear and angular motion relative to three mutually perpendicular longitudinal, lateral and vertical axes for six degrees of freedom comprising:

a platform assembly including an upper platform and a lower platform; and at least six telescoping, interconnecting struts connected to said upper platform and said lower platform at separate attachment points to form a geodetic arrangement, at least one of said struts having a strut end capable of providing at least two degrees of freedom of movement, said strut end including:

a trunnion mount comprising a strut attachment fitting extending from said strut end, a housing and a base;

said strut attachment fitting having at least two transverse pivots extending therefrom;

said housing being pivotally connected to said strut attachment fitting, said housing including means for determining the extension of said at least one of said struts and having at least one pivotal attachment extending therefrom and connected to said base, said at least one pivotal attachment being disposed in a plane perpendicular to said at least two transverse pivots, whereby;

said trunnion mount provides at least two pivotal degrees of freedom of movement for said at least one of said struts.

2. The powered material handling apparatus according to claim 1 wherein said at least one of said struts further comprises a second end having trunnion attachment means.

3. The powered material handling apparatus according to claim 1 further comprising:

a secondary lifting device disposed beneath and connected to said lower platform.

* * * * *